United States Patent [19]
Popov et al.

[11] 4,241,268
[45] Dec. 23, 1980

[54] LINEAR INDUCTION MOTOR

[76] Inventors: Alexandr D. Popov, prospekt Koroleva, 12, kv. 154; Vladimir A. Solomin, ulitsa Dachnaya, 14, kv. 31, both of Rostov-na-Donu, U.S.S.R.

[21] Appl. No.: 77,312

[22] Filed: Sep. 20, 1979

[51] Int. Cl.³ ............................................. H02K 41/00
[52] U.S. Cl. ..................................................... 310/13
[58] Field of Search ..................................... 310/12–19

[56] References Cited
U.S. PATENT DOCUMENTS

| | | | |
|---|---|---|---|
| Re. 28,161 | 9/1974 | Bolton et al. | 310/13 |
| 3,770,995 | 11/1973 | Eastham et al. | 310/13 |

*Primary Examiner*—Donovan F. Duggan
*Attorney, Agent, or Firm*—Steinberg & Raskin

[57] ABSTRACT

A linear induction motor comprises an electrically conductive secondary element of a rectangular cross-section and an inductor. The inductor has laminated U-shaped and E-shaped cores, each carrying a polyphase winding. The laminated cores of each shape make up two respective rows in each of which they are arranged one after another with their bases facing respective faces of the secondary element. The outermost legs of each pair of the E-shaped cores in both rows are disposed between the adjacent U-shaped cores of each row without a gap so that the bases of the E-shaped cores and the bases of the U-shaped cores of the respective rows define non-serrated active areas.

1 Claim, 1 Drawing Figure

U.S. Patent     Dec. 23, 1980     4,241,268
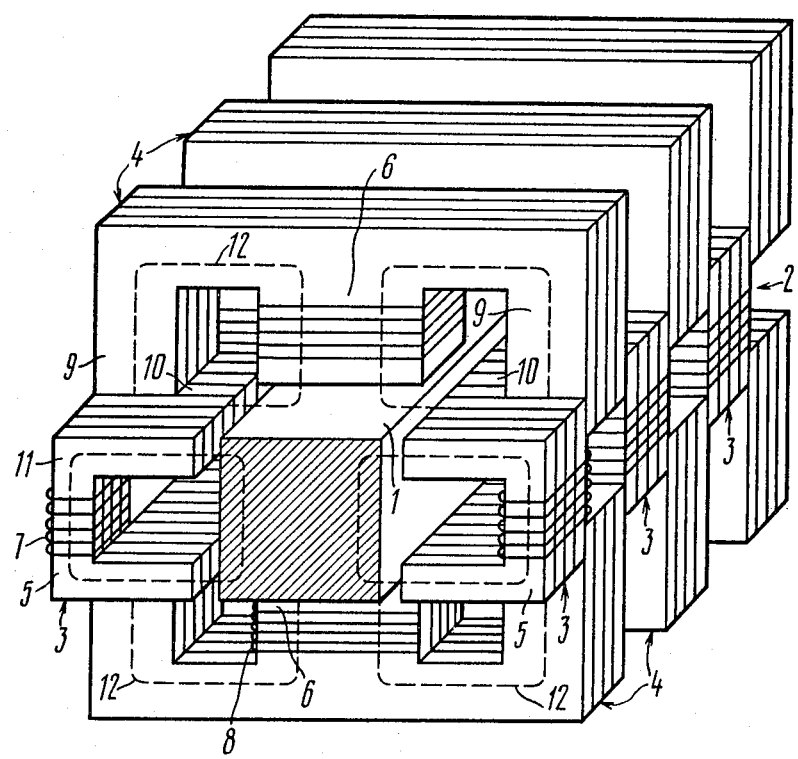

LINEAR INDUCTION MOTOR

FIELD OF THE INVENTION

The present invention relates to electric machines and more particularly to linear induction motors.

The present invention may advantageously be used in various electric drives providing for rectilinear and reciprocating motion of working members, as well as in pumping of liquid metals and electrically conductive fluids.

BACKGROUND OF THE INVENTION

Known in the art is a linear induction motor (cf. "Linear Electric Motors" by B. M. Aizenshtein, FIG. 18, p. 61, in the book "Itogi nauki i tekhniki" (Science and Technology Review), Electric Machines and Transformers, v.I, Moscow, VINITI, 1975, in Russian), comprising an electrically conductive secondary element of a rectangular cross-section and an inductor provided with laminated U-shaped cores carrying each a polyphase winding and making up two rows, said cores being arranged in each row one after another in the direction of a magnetic field with the bases thereof facing opposite faces of the secondary element.

In said electric motor provision is made for gaps between the laminated U-shaped cores in each row, and the magnetizing force is thus distributed in the air gap in a stepwise manner and the motor is able to develop only inconsiderable tractive effort and has a low efficiency.

SUMMARY OF THE INVENTION

It is therefore an object of the present invention to provide a linear induction motor featuring an increased tractive effort and a higher efficiency.

This object is accomplished by that in a linear induction motor comprising an electrically conductive secondary element of a rectangular cross-section and an inductor having laminated U-shaped cores carrying each a polyphase winding and making up two rows in each of which the cores are arranged one after another with their bases facing the opposite faces of the secondary element, said inductor comprises, according to the invention, laminated E-shaped cores carrying polyphase windings and having pole pieces on their outermost legs, said cores forming two rows and being arranged in each row one after another with the bases of their central legs mounting polyphase coils facing the opposite faces of the electric-conducting secondary element and with the outermost legs in each pair of the two rows being disposed between two adjacent U-shaped cores of each row without a gap so that the bases of the pole-pieces of the E-shaped cores and the bases of the U-shaped cores of respective rows define non-serrated active areas.

In the motor of the present invention the magnetizing force is changed substantially sinusoidally, which increases the tractive effort of the linear induction motor as well as its efficiency.

BRIEF DESCRIPTION OF THE DRAWING

Other objects and advantages of the present invention will become more apparent from the following description of a specific embodiment thereof taken in conjunction with the accompanying drawing, wherein illustrated is a general view of a linear induction motor in accordance with the invention.

DETAILED DESCRIPTION OF THE INVENTION

A linear induction motor comprises an electrically conductive element 1 of a rectangular cross-section and an inductor 2. The inductor 2 has laminated U-shaped cores 3 and E-shaped cores 4.

A yoke 5 of each core 3 mounts a polyphase winding 7, where as a central bar 6 of each core 4 carries a polyphase winding 8. Outermost legs 9 of each core 4 are provided with pole pieces 10. The cores 3,4, each shape make up two rows. In each row the respective cores are arranged one after another in the direction of a magnetic field. The bases of the central legs 6 of the cores 4 and the bases of the legs 11 of the cores 3 face the opposite faces of the element 1, respectively. The outermost legs 9 of the cores 4, for each pair thereof in both rows, are disposed between two adjacent cores 3 of each row so that the bases of the pole pieces 10 and the bases of the bars 11 of the cores 3 of respective row define non-serrated (plain) active areas.

The linear induction motor of the invention operates as follows.

When the polyphase windings 7 and 8 of the inductor 2 of the linear induction motor get connected to a three-phase voltage supply source (not shown in the drawing) a magnetic field is induced which travels in a longitudinal direction and components of which close in a transverse direction with the respect to the direction of the magnetic field travel (shown in the drawing by a dashed line 12). The traveling magnetic while crossing the electric-conducting secondary element 1 induces electromotive forces therein. Under the action of the electromotive forces three-phase eddy currents flow in the element 1 which interact with the traveling magnetic field of the inductor 2. This interaction produces a tractive effort in the linear induction motor, which moves the inductor 2 in the direction opposite to the travel of the magnetic field.

The combination of U-shaped cores 3 and E-shaped cores 4 makes it possible to obtain six active areas of the inductor 2, the active areas of the inductor 2 defined by the bases of the pole pieces 10 of the legs 9 of the cores 4 and by the bases of the legs 11 of the cores 3 being non-serrated. In the air gaps between the non-serrated active areas of the inductor 2 and the element 1 the distribution of the magnetizing force maximally reaches a sinusoidal one as much as possible. In such embodiment of the invention the influence of the upper harmonics is decreased, thereby increasing the efficiency of the motor.

Two additional active areas increase the area of interaction of the inductor 2 and secondary element 1, which causes an increase in the tractive effort developed by the linear induction motor.

What is claimed is:

1. A linear induction motor comprising:
   an electrically conductive secondary element of a rectangular cross-section having two pairs of opposite faces;
   an inductor magnetically coupled with said electrically conductive secondary element;
   laminated U-shaped cores of said inductor, making up two rows and arranged in each row one after another in the direction of a magnetic field, having bases which face the first one of said pairs of the opposite faces of said electrically conductive secondary element;

laminated E-shaped cores making up two rows, disposed in each said row one after another and each having a central leg incorporating a base, and also having two outermost legs each mounting a pole piece having a base, said central bars in each of said rows having their bases facing respectively the second of the opposite faces of said secondary element, ehereas said outermost legs being disposed between two adjacent ones of said laminated U-shaped cores of each said row without a gap so that said bases of said pole pieces and said bases of said laminated U-shaped cores of respective rows define non-serrated active areas;

polyphase windings positioned on each of said laminated U-shaped cores and laminated E-shaped cores.

* * * * *